DAVID WILLIAMSON, OF ELIZABETH, PENNSYLVANIA.

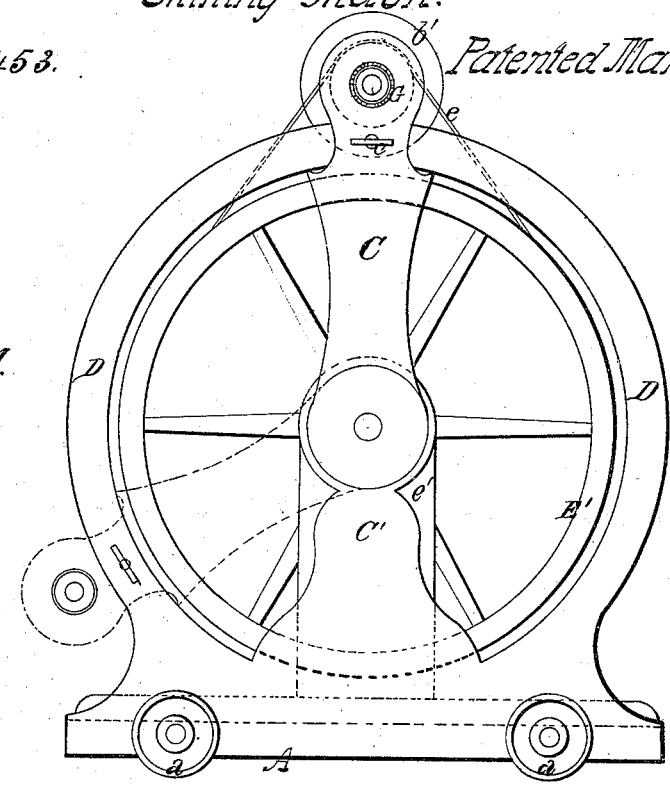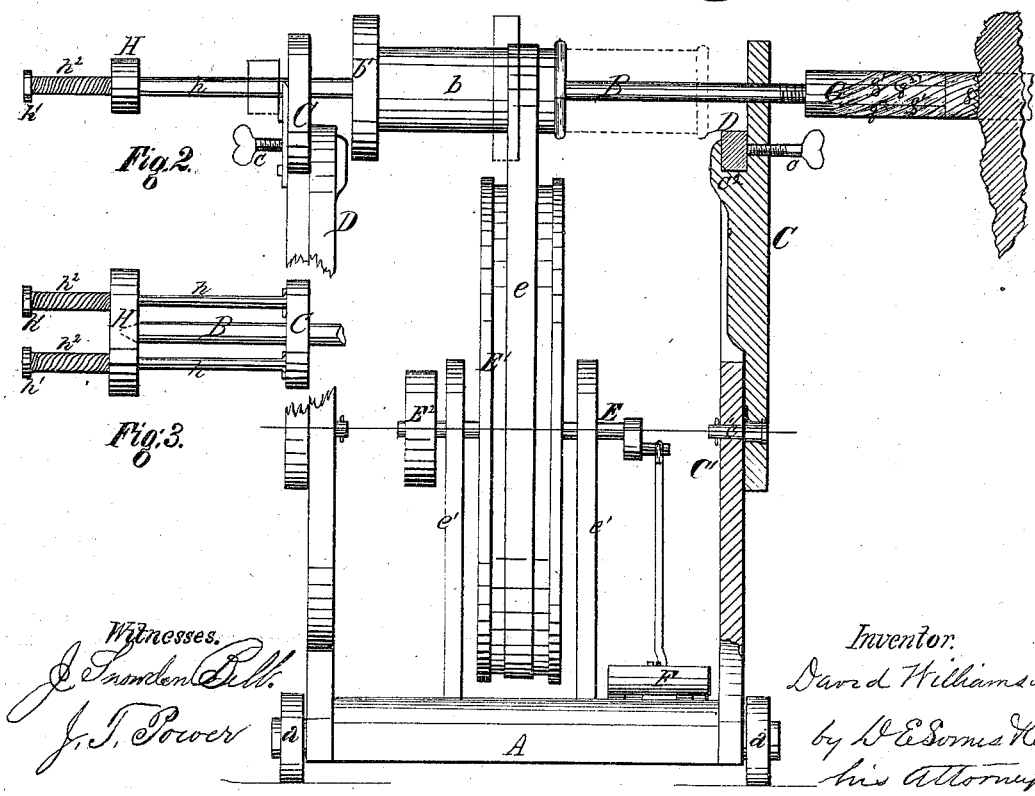

Letters Patent No. 87,453, dated March 2, 1869.

IMPROVED MINING-MACHINE.

The Schedule referred to in these Letters Patent and making part of the same.

*To all whom it may concern:*

Be it known that I, DAVID WILLIAMSON, of Elizabeth, in the county of Allegheny, and in the State of Pennsylvania, have invented a new and useful Machine for Mining; and I do hereby declare that the following is a full, clear, and exact description thereof, reference being had to the accompanying drawings, which make part of this specification, and in which—

Figure 1 represents a side elevation of my improved mining-machine;

Figure 2, an end view of the same, partly in elevation and partly in section; and Figure 3, a plan or top view of the feed-arrangement detached.

The object of my invention is to provide a suitable machine for mining or quarrying coal, ore, stone of various kinds, &c., in which the position of the cutting-tool can be varied at pleasure, to conform to the variations of level in the vein or bearing, without altering its relation to the driving-mechanism, and likewise to provide a convenient and efficacious tool for use in connection with the same; to which ends, My improvements consist—

First, in mounting the saw-mandrel in bearings in the free ends of arms, which are pivoted upon a movable carriage, concentric with the driving-wheel, from which the said mandrel receives its motion in such manner, that by traversing the arms upon circular guides, secured to the carriage, the horizontal position of the mandrel can be varied to conform to the inclination of the vein, without interrupting its connection with the driving-wheel.

Second, in a cylindrical saw or auger, having teeth at its front or cutting-end, and provided with spiral corrugations extending thence toward its rear, for the purpose of carrying off the dust or chips formed by the teeth when in operation, the same escaping through holes in the periphery of the auger, made for that purpose.

In the accompanying drawings, which show a convenient arrangement of parts for carrying out the objects of my invention—

A represents a movable carriage, supported upon wheels $a$, which may be flanged to run upon a railway-track, if desired.

B represents the saw-mandrel, which is mounted in bearings in the free ends of the arms C C, which are pivoted to the bearings C' C' upon the carriage A, and concentric with the driving-shaft E.

Jaws, $c^2$, are formed upon the arms C, near their free ends, which embrace circular guides D D, secured upon the carriage A, which guides are likewise concentric with the driving-shaft E.

The arms C can be swung into any position upon the guides D, and clamped by the set-screw $c$, so that the horizontal position of the saw-mandrel can be varied at pleasure, without altering its distance from the driving-shaft, and the two are thus maintained in gear, no matter what position may be assigned to the arms.

The driving-shaft E is mounted in bearings $e'$ upon the carriage A, and may be operated by any suitable power, either through the treadle F, pulley $E^2$, or a crank, as found most convenient. It carries a large driving-pulley, $E^1$, from which motion is communicated to a small pulley, $b$, on the saw-mandrel B, by the belt $e$, the relative diameters of the two pulleys depending upon the rapidity with which the saw is to be rotated.

The mandrel B is susceptible of end motion in its bearings, to the extent of the depth of cut required, and the pulley $b$ is therefore made of sufficient length to allow the distance to be traversed, without interrupting its connection with the driving-pulley $E^1$.

The mandrel likewise carries a balance-wheel, $b'$, to regulate its motions.

Gearing may be substituted for the pulleys, if deemed preferable; and in that case, the pinion upon the mandrel B may be of the same width as its driving-gear, and rotate upon a feather on the mandrel, to admit of the longitudinal motion of the same, or a reverse arrangement may be adopted, a feather upon the pinion entering a longitudinal groove in the mandrel.

In the process of mining to which this machine is particularly adapted, a series of holes is bored in the vein or bearing, contiguous to each other, and about two feet in depth, for the purpose of forming lines of fracture for the dislodgment and removal of the coal or ore, and, by the arrangement just decribed, the direction of these lines may be readily made conformable to that of the vein. It is furthermore desirable to employ a tool which will bore with facility a hole from which the core can be easily removed, and which, in practice, is usually about two inches in diameter.

For this purpose I employ a cylindrical saw, or auger G, screwed, keyed, or otherwise secured upon the mandrel B, and having saw-teeth, $g$, all round its outer or cutting-end, from which spiral corrugations, $g^1$, extend toward its rear, near which are formed openings, $g^2$.

The dust or chips made by the saw-teeth when in operation are carried backward by the spiral corrugations, and drop out through the openings $g^2$, thereby presenting no impediment to the operation of the saw, and enabling the core to be readily removed.

The saw is fed into the material to be bored, by the spiral springs $h^2$, which encircle the guide-rods $h$, secured to the movable arm C which is farthest from the saw, and bear against fixed collars $h^1$, secured upon the rods, and a sliding cross-head, H, which moves longitudinally upon them, and bears in turn against the end of the mandrel B, by which means the saw is caused to advance into the vein in proportion as it cuts the same.

The guides D may be either circular or segmental and of any form of cross-section preferred, and may either form one piece with the bearings C', or be made separate.

Having thus fully described my invention,

What I claim therein as new, and desire to secure by Letters Patent, is—

1. The arms C C, pivoted upon a frame or carriage concentrically with the driving-axle of the machine, and carrying the saw-mandrel, in combination with the circular or segmental guides D D, as set forth.

2. The guide-rods $h\ h$, and spiral springs $h^2\ h^2$, in combination with the cross-head H and saw-mandrel B, arranged and operating substantially as and for the purpose set forth.

3. The frame A, driving-shaft E, and driving-pulley E', in combination with the circular or segmental guides D, arms C, and saw-mandrel B, arranged and operating substantially as and for the purposes described.

4. A cylindrical saw, having teeth at its working-end, and spiral corrugations extending therefrom towards its opposite end, as well as openings in its periphery, for the escape of dust or chips, as set forth.

The above specification signed by me, this 1st day of October, 1868.

DAVID WILLIAMSON.

Witnesses:
J. H. MAFFET,
R. DONALDSON.